United States Patent [19]

Toyoda et al.

[11] 4,456,931
[45] Jun. 26, 1984

[54] ELECTRONIC CAMERA

[75] Inventors: Kenji Toyoda, Chigasaki; Takao Watanabe, Koshigaya; Hideya Inoue, Kawasaki; Atsumi Kasuya, Tokyo; Yutaka Ichihara, Yokohama; Akira Miyaji, Tokyo; Katsumi Mizunoe, Kawasaki, all of Japan

[73] Assignee: Nippon Kogaku K.K., Tokyo, Japan

[21] Appl. No.: 316,666

[22] Filed: Oct. 29, 1981

[30] Foreign Application Priority Data

Oct. 31, 1980 [JP] Japan .............................. 55-153579

[51] Int. Cl.³ .............................................. H04N 5/76
[52] U.S. Cl. .................................... 358/335; 358/906
[58] Field of Search ............... 358/83, 310, 335, 906, 358/213, 22; 360/33.1, 35.1, 10.1, 10.2, 10.3

[56] References Cited

U.S. PATENT DOCUMENTS

| 4,130,834 | 12/1978 | Mender et al. | 360/35.1 |
| 4,131,919 | 12/1978 | Lloyd et al. | 360/35.1 |
| 4,133,009 | 1/1979 | Kittler et al. | 358/906 |
| 4,163,256 | 7/1979 | Adcock | 358/906 |
| 4,262,301 | 4/1981 | Erlichman | 360/10.1 |

FOREIGN PATENT DOCUMENTS 52-8719  1/1977  Japan ..................................... 358/22

Primary Examiner—D. McElheny, Jr.
Attorney, Agent, or Firm—Fitzpatrick, Cella, Harper & Scinto

[57] ABSTRACT

Electronic camera comprises an image taking unit and a memory unit connected detachably. The image taking unit generates image signals corresponding to an object. The image signals are transmitted to the memory unit to be stored therein. The memory unit is detached from the image taking unit and connected to an external memory device such as a video tape recorder. The image taking unit has a monitor which can display the image signals in visual form before recording them in the memory unit.

20 Claims, 11 Drawing Figures

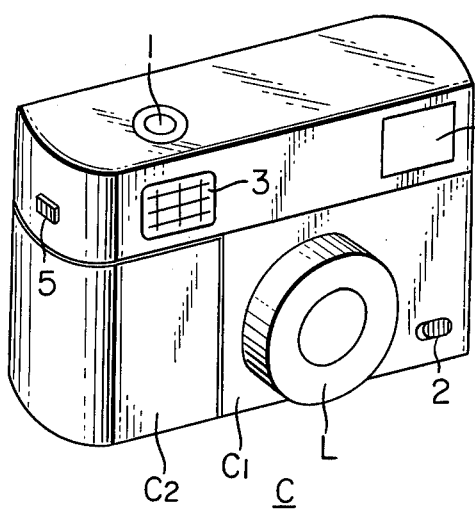
FIG. 1
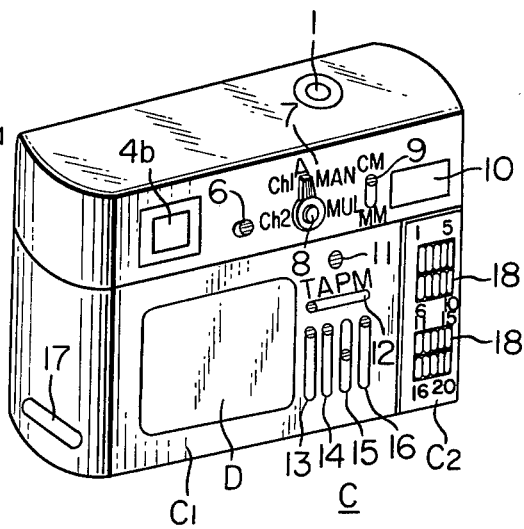
FIG. 2
FIG. 5A
FIG. 5B
FIG. 5C
FIG. 5D
FIG. 5E
FIG. 5F
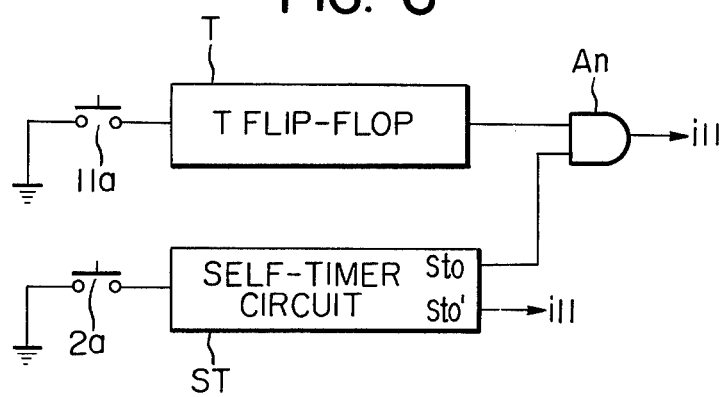
FIG. 6

ELECTRONIC CAMERA

BACKGROUND OF THE INVENTION

1. Field of the Invention

The present invention relates to an electronic camera, and more particularly to an electronic camera in which an optical image formed by an imaging optical system is converted by image-sensing means into electronic image signals which are rendered visible by display means and stored in memory means.

2. Description of the Prior Art

An electronic camera in which an optical image is converted into electronic image signals and transferred to memory means for storage therein is already disclosed for example in the U.S. Pat. application Ser. No. 891,705 filed on Mar. 30, 1978, corresponding the Japanese Patent Laid-Open No. Sho54-136325.

In such conventional technology, the still image signals of one frame from the image-sensing means are recorded in memory means such as a video tape or a video disk, and the thus recorded image is viewed on the display means. Consequently the evaluation of the images taken is only possible by the playback of the images already recorded in the memory means of a limited capacity, and for this reason the memory means has to record such images as will be eventually evaluated as unnecessary.

SUMMARY OF THE INVENTION

The object of the present invention is to provide an improvement in the electronic camera as explained in the foregoing.

Another object of the present invention is to provide an electronic camera allowing evaluation of an image taken by the image-sensing means prior to the storage of said image in the memory means.

Still another object of the present invention is to provide an electronic camera capable of displaying a still image for the purpose of evaluation thereof prior to the storage thereof in the memory means.

Still another object of the present invention is to provide an electronic camera capable of synthesizing plural images and storing the thus syntherized image after evaluation thereof.

BRIEF DESCRIPTION OF THE DRAWINGS

FIGS. 1 and 2 are external perspective views of an embodiment of the present invention;

FIGS. 5A to 5F are plan views of a display element of the present embodiment showing the modes of display thereof; and FIG. 6 is a block diagram of a circuit for on-off control of the monitor.

DESCRIPTION OF THE PREFERRED EMBODIMENTS

Now the present invention will be clarified in detail by an embodiment thereof shown in the attached drawings.

Figure 3:
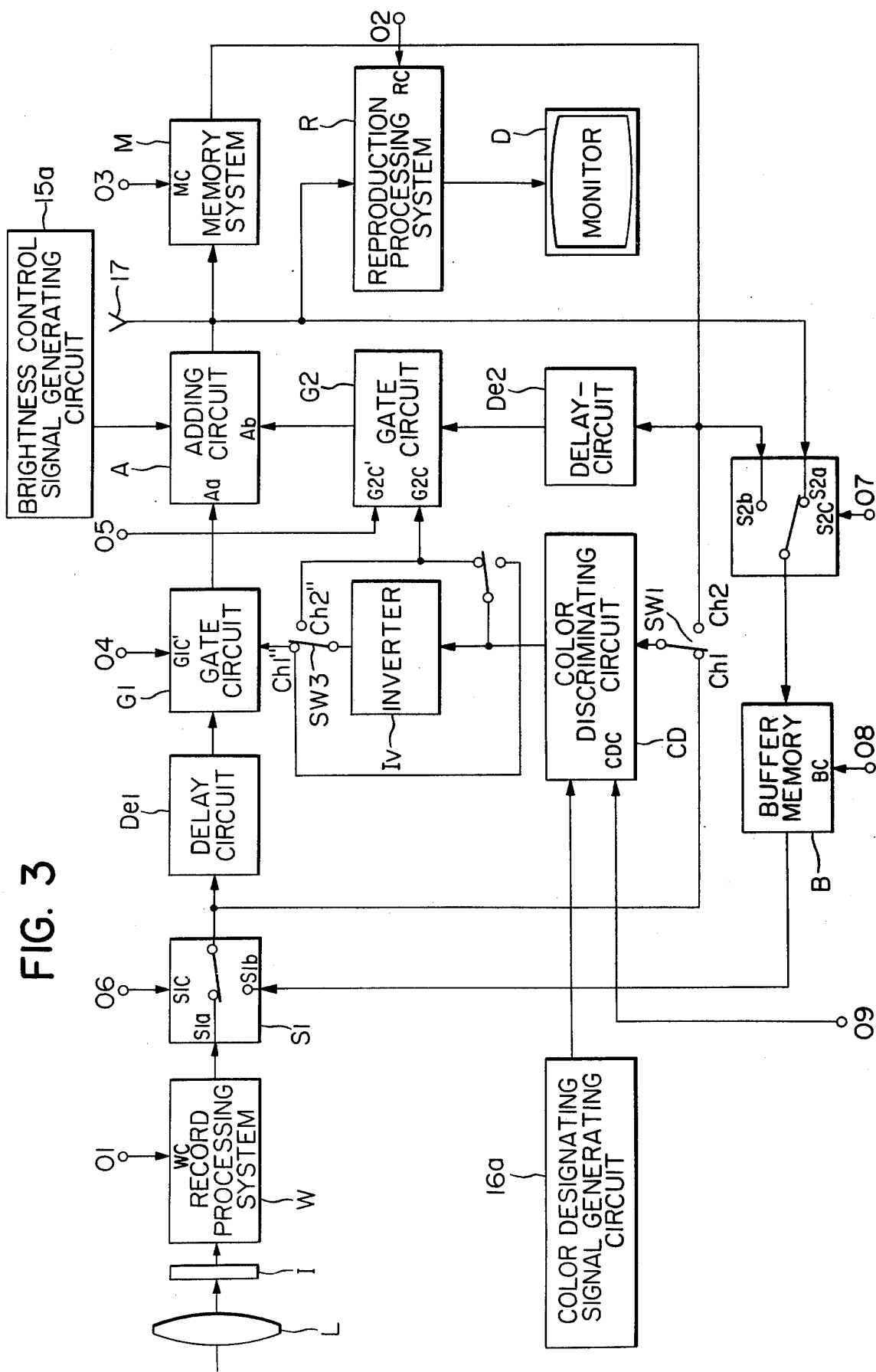
FIG. 3 is a block diagram of said embodiment.
Figure 4:
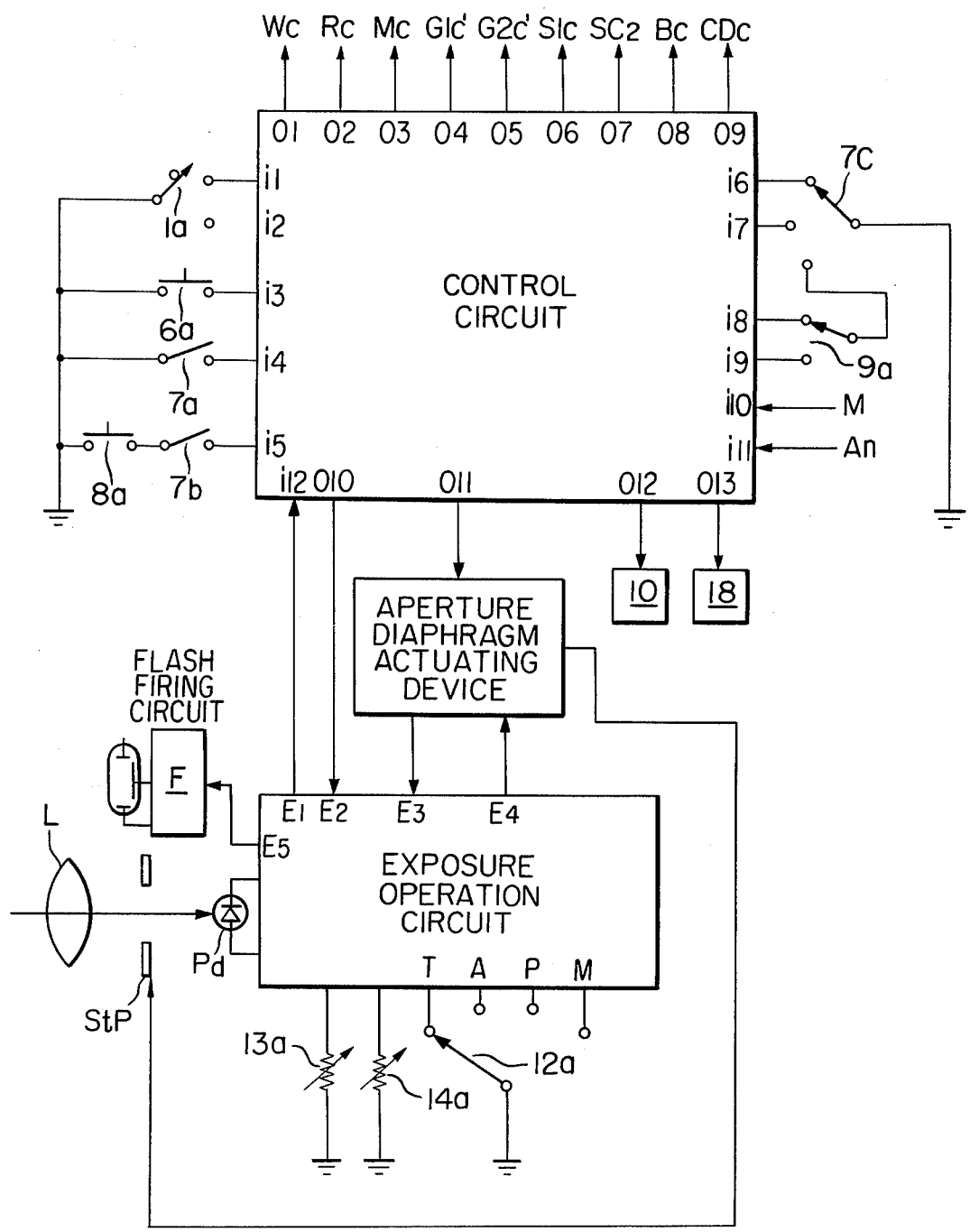
FIG. 4 is a block diagram of the control system of said embodiment.

At first, it is to be noted that, in the block diagrams shown in FIGS. 3 and 4, arrows between components merely indicate the direction of signal transfer and do not indicate that the related components are connected through only one line nor that only one signal is transferred between such components.

Referring to FIG. 1, an electronic camera of the present invention is composed of an image-taking unit C1 and a memory unit C2 mutually connected in a detachable manner. The image-taking unit C1 generates image signals corresponding to an object, and said signals are transferred to the memory unit C2 for storage in a memory system incorporated therein and to be explained later. The memory unit C2 can be detached from the image-taking unit C1 and connected to an unrepresented external memory means such as a video tape recorder for transferring the image signals stored in the memory system to such memory means.

The image-taking unit C1 is provided on the upper face thereof with a trigger button 1, which can be pressed down for a first stroke and further for a deeper second stroke for initiating the function of the electronic camera. The first and second strokes will hereinafter be referred to as half-push and full-push, respectively. On the front face of the electronic camera there are provided an imaging optical system L detachable from the image-taking unit C1, a push-button 2 for initiating the function of a self-timer, a flash tube 3, and an objective window 4a of an optical view-finder 4. On a lateral face of the camera there is provided a slider 5 to be actuated for detaching the memory unit C2 from the image-taking unit C1. On the upper part of the rear face of the image-taking unit C1 there are provided an eyepiece 4b of said optical view-finder, a clear button 6 for re-starting the image-taking operation, a switch lever 7 for selecting various image-taking modes, and an access button 8 positioned on the rotary shaft of the switch lever 7. The switch lever 7 has selectable positions "A" for selecting an automatic access mode, "MAN" for selecting a manual access mode, "MUL" for a multiple exposure mode, and "CH1", "CH2" for selecting first and second chroma key modes respectively. These modes will be explained later. The access button 8 is used for cyclically accessing to the image signals of plural frames stored in the memory system in the memory unit C2. In addition, provided, on the upper part of the rear face of the image-taking unit C1, are a slide switch 9 for selecting the mode for synthesizing image signals when a mode for obtaining synthesized image signals, i.e. the multiple exposure mode or chroma key mode, is selected, and a display element 10 such as 7-segment liquid crystal display device for indicating the kind of the image shown on a monitor D to be explained later. Also in the lower part of the rear face there are provided a monitor D composed of an electro-optical display device such as a liquid crystal matrix device or an electro-luminescence device for displaying the image signals of a frame; a push-button 11 for turning on and off the function of said monitor D; a slider 12 for selecting the exposure mode; a slider 13 for determining the exposure time; a slider 14 for determining the diaphragm stop; a slider 15 for adjusting the brightness; and a slider 16 for color designation in the chroma key mode. The exposure mode selecting slider 12 has positions "T" for shutter-preferential automatic exposure mode, "A" for diaphragm-preferential automatic exposure mode, "P" for programmed automatic exposure mode, and "M" for manual exposure mode. On a lateral face of the image-taking unit C1 provided is a connector 17 for supplying the image signals to an external memory such as a video tape recorder or to a cathode ray tube display device, or entering the image signals from an external memory or from an external image-taking device.

On the rear face of the memory unit C2 there is provided a display element 18 composed of an electro-optical display element such as an electrochromic display element for indicating the state of use of the memory system.

Referring to FIG. 3, the light from an unrepresented object is focused through an imaging optical system L onto an image-sensing element I such as a charge coupled device having a color mosaic filter and effecting photoelectric conversion of the image of said object. The electric signal thus obtained corresponding to the object is read as 'original' image signal repeatedly at a frequency of moving image, for example at 30 frames per second, by means of a drive signal from a record processing system W. The original image signal is subjected in the record processing system W to the amplification and to the analog-to-digital conversion in case the memory system M and a buffer memory B, to be explained later, are composed of digital memories. Thereafter said signal is entered into a switching circuit S1 through a first input terminal S1$a$ thereof, then delayed in a delay circuit Del, transmitted through a gate circuit G1 and supplied to an adding circuit A through a first input terminal Aa thereof.

The adding circuit A, being provided also with a second input terminal Ab, is capable of providing a synthesized signal by adding image signals received at said input terminals Aa and Ab but transmits the received signal without change in case only one input signal is received. Also the circuit A is connected to brightness adjust signal generating means 15$a$ linked with the aforementioned brightness control slider 15 to adjust the brightness level of the image signal entered into the circuit A according to the manipulation of the slider 15. After being released from the circuit A, the original image signal is dividedly supplied to a reproduction processing system R, the memory system M, a first input terminal S2$a$ of a switching circuit S2 and the aforementioned connector 17.

The reproduction processing system R transmits the entered image signal to the aforementioned monitor D after amplification, and digital-to-analog conversion in case the entered image signal is in the form of a digital signal. The monitor D displays the entered image signal in visual form under the control by the drive signal from the reproduction processing system R.

Thus, in response to the original image signal entered to the reproduction processing system R, the monitor D displays the image of the object focused on the image-sensing element I as a moving image.

The above-mentioned path of the original image signal from the image-sensing element I to the monitor D, i.e. the path I-W-S1-Del-G1-A-R-D, will hereinafter be referred to as ID path.

Also the original image signal supplied from the image-sensing element I to the first input terminal S2$a$ of the switching circuit S2 through the adding circuit A can be stored, through the switching circuit, into the buffer memory B having a capacity corresponding to one frame of image. Thus an arbitrary frame of the original image signals supplied in succession is stored in the buffer memory B, and the original image signal of one frame stored in the memory B will hereinafter be referred to as shot image signal.

Also the path of the original image signal from the image-sensing element I to the buffer memory B, i.e. the path I-W-S1-Del-G1-A-S2-B will hereinafter be referred to as IB path.

Furthermore the original image signal supplied from the image-sensing element I to the memory system M through the adding circuit A is stored in the memory system M, which is incorporated in the memory unit C2 and has a capacity of several frames of the entered image signals, allowing random access to any frame of the stored image signals, which will be referred to as the stored image signals. The memory system M is composed for example of plural memories each of one-frame capacity such as video random access memories or magnetic bubble memories, any one of which is randomly accessible and is connected to the input and output terminals of the memory system M upon access.

Each memory is composed of a plurality of memory cells each of which is allotted to image signal of a pixel or picture element.

The path of the original image signal from the image-sensing element I to the memory M, i.e. the path I-W-S1-Del-G1-A-M, will hereinafter be referred to as IM path.

The stored image signal read from the memory system M is supplied to a delay circuit De2 and to a second input terminal S2$b$ of the switching circuit S2.

The stored image signal supplied to the delay circuit De2 is transmitted, after delay therein, through a gate circuit G2, to a second input terminal Ab of the adding circuit A and released therefrom after addition with the input signal, if any, to the first input terminal Aa.

The stored image signal supplied from the adding circuit A to the reproduction processing system R is subjected to the aforementioned process and supplied to the monitor D for display in the form of a still image.

The path of the stored image signal from the memory system M to the monitor D, i.e. the path M-De2-G2-A-R-D, will hereinafter be referred to as MD path.

Also the stored image signal supplied from the memory system M to the adding circuit A and then to the memory system M again is stored therein.

The path of the stored image signal from the memory M to said memory M, i.e. the path M-De2-G2-A-M, will hereinafter be referred to as MM path.

Furthermore to the stored image signal supplied from the memory system M to the second input terminal S2$b$ of the switching circuit S2 can be stored in the buffer memory B through said switching circuit S2.

The path of the stored image signal from the memory system M to the buffer memory B, i.e. the path M-S2-B will hereinafter be referred to as MB path.

Furthermore the stored image signal supplied from the memory system M to the second input terminal S2$a$ of the switching circuit S2 through the adding circuit A can be stored in the buffer memory B through said switching circuit S2.

The path of the stored image signal from the memory system M to the buffer memory B through the adding circuit A, i.e. the path M-De2-G2-A-S2-B, hereinafter be referred to as MAB path.

The shot or stored image signal stored in the buffer memory B is supplied to the switching circuit S1 through a second input terminal S1$b$ thereof, and transmitted through the delay circuit Ge1 and the gate circuit G1 to the first input terminal Aa of the adding circuit A.

The image signal supplied from the adding circuit A to the reproduction processing circuit R is supplied, after the aforementioned process therein, to the monitor D for display in the form of a still image.

The path of the image signal from the buffer memory B to the monitor D, i.e. the path B-S1-Del-G1-A-R-D, will hereinafter referred to as BD path.

The image signal supplied from the buffer memory B to the memory system M through the adding circuit A is stored in said memory system M.

The path of the image signal from the buffer memory B to the memory system M, i.e. the path B-S1-Del-G1-A-M, will hereinafter be referred to as BM path.

In FIG. 3, a chroma key circuit is composed of switches Sw1, Sw2, Sw3, a color discriminating circuit CD, an inverter Iv, gate circuits G1, G2, and delay circuits De1, De2.

The switch Sw1 is connected through the common terminal thereof to an input terminal of the color discriminating circuit CD, and connected through terminals Ch1, Ch2 thereof respectively to the output terminals of the switching circuit S1 and of the memory system M. Also the switch Sw2 has a common terminal connected to the output terminal of the circuit CD and the input teriminal of the inverter Iv, a terminal ch1′ connected to a first control input terminal G2c of the gate circuit G2, and a terminal ch2′ connected to a first control input terminal G1c of the gate circuit G1. The switch Sw3 is provided with a common terminal connected to the output terminal of the inverter Iv, a terminal ch1″ connected to a first control input terminal G1c of the gate circuit G1, and a terminal ch2″ connected to a first control input terminal G2c of the gate circuit G2. The switches Sw1, Sw2 and Sw3 are controlled by the switch lever 7 in such a manner that said switches are in a unconnected neutral position when the lever 7 is in a position "A", "MAN" or "MUL" while the switches are connected to the terminals ch1, ch1′ and ch1″ or ch2, ch2′ and ch2″ respectively when the lever 7 is positioned at "ch1" or "ch2".

The color discriminating circuit CD has an input terminal connectable to the switching circuit S1 or the output terminal of the memory system M through the switch Sw1 and discriminates the color information of the image signal received from the switching circuit S1 or the memory system M.

In response to the detection of a particular color in the image signal, the color discriminating circuit CD releases an H-level signal or otherwise releases an L-level signal. The circuit CD is provided with color designating signal generating means 16a for designating a color to be detected in relation to the aforementioned slider 16, and provides an output signal either to the first control input signal G1c or G2c of the gate circuit G1 or G2 according to the position of the switch Sw2. The switch Sw3 is connected to the input terminal G2c when the switch Sw2 is connected to the input terminal G1c, and vice versa. Consequently the output signal of the inverter Iv, i.e. the inverted output signal from the circuit CD is supplied to the input terminal G2c when the output signal of said circuit CD is supplied to the input terminal G1c, and vice versa.

The gate circuits G1, G2 are opened or closed complementarily depending on the H-level or L-level of the input to the first control input terminals G1c, G2c. Through unrepresented signal lines the input terminals G1c, G2c receive H-level signals when said switches Sw1, Sw2 and Sw3 are in the neutral position or when the circuit CD is not in function. Consequently according to the state of the output from the color discriminating circuit CD and the inverter Iv, the gate circuits G1, G2 are controlled to transmit or interrupt the image signals supplied from the delay circuits De1, De2.

The delay circuits De1, De2 are provided to synchronize the image signal subjected to color discrimination in the color discriminating circuit CD with the image signal controlled by the gate circuits G1, G2.

Referring to FIG. 4, a control circuit CC controls the function of the various components in the present embodiment. Upon half-push or full-push of the trigger button 1 a switch 1a is respectively connected to an input port i1 or an input port i2 of the circuit CC to transmit the actuation of the trigger button to the circuit CC. A switch 6a is closed upon actuation of the clear button 6 to transmit a clear signal to the circuit CC through an input port i3. A switch 7a is closed upon positioning the lever 7 at "ch1" or "ch2" to transmit to the circuit CC through an input port i4 that the chroma key mode is selected. Also a switch 7b is closed when the lever 7 is not positioned at "A". A switch 8a is closed upon actuation of the access button 8 to transmit, if said switch 7b is also closed in this state, a manual access signal to the circuit CC through an input port i5 thereof. A switch 7c is connected to an input port i6 of the circuit CC when the lever 7 is positioned at "A", to an input port i7 at a lever position "MAN", or to the common terminal of a switch 9a at a lever position "MUL", "ch1" or "ch2", thereby transmitting the selected image-taking mode to the control circuit CC. Said switch 9a is connected to an input port i8 of the circuit CC when the slider 9 is positioned at "CM" or to an input port i9 at a slider position "MM" thereby transmitting the selected synthesized image mode if the lever 7 is positioned at "MUL", "ch1" or "ch2" to connect the switch 7c with the switch 9a. Also an input port i10 is connected to the output terminal of the memory system M, and an input port i11 is connected to the output terminal of an AND circuit as shown in FIG. 6.

An output port o1 of the control circuit CC is connected to a control terminal wc of the record processing circuit W to release drive signals for driving said circuit W or synchronizing signals for reading the image signal from the image-sensing element I. An output port o2 is connected to a control terminal Rc of the reproduction processing system R to supply drive signals thereto and synchronizing signals for display on the monitor D. An output port o3 is connected to a control terminal Mc of the memory system M.

In case the memory system M is composed for example of video random-access memories, said output port o3 also provides the memory system M with signals for storing or reading image signal into or from an arbitrary memory. Said signals comprise a first address signal for accessing to an arbitrary memory, a write-in signal for storing the image signal to thus accessed memory through the input terminal, a readout signal for reading the recorded image signal through the output terminal, and a second address signal for writing or reading the image signal of one frame into or from the memory cells.

Output ports o4 and o5 of the control circuit CC are respectively connected to the second control input terminals G1c, G2c of the gate circuits G1, G2 to transmit the control signals for on-off control of said gates. Consequently said gate circuits are controlled by the aforementioned chroma key circuit and also by said control circuit CC. Each of said gate circuits is opened upon receipt of H-level signals at the first and second control input terminals thereof.

Output ports o6 and o7 of the circuit CC are respectively connected to control input terminals S1c, S2c of the switching circuits S1, S2 for transmitting the signals for controlling said circuits.

An output port o8 is connected to a control terminal Bc of the buffer memory B for example composed of a video random-access memory of a memory capacity for the image signal of one frame, to transmit a write-in signal for enabling the signal storage into the memory B, a read-out signal for enabling the signal read-out from said memory B and an address signal, corresponding to the aforementioned second address signal, for write-in and read-out of the image signal.

An output port o9 is connected to a control terminal CDc of the color discriminating circuit to transmit drive signals thereto.

An exposure operation circuit E is provided with variable resistors 13a, 14a respectively linked with the sliders 13, 14 shown in FIG. 2, a switch 12a to be actuated by the aforementioned exposure mode selecting slider 12, and light-measuring element Pd for receiving the light transmitted by the imaging optical system L and the diaphragm stop Stp. Said variable resistors 13a, 14a transmits the information of exposure time and diaphragm manually selected by the sliders 13, 14 to said circuit E. Also the light-measuring element Pd transmits the information on the brightness of the object to said circuit E.

The switch 12a is connected to one of the terminals corresponding to the position of said slider 12. The exposure operation circuit E calculates, at a terminal T, the appropriate diaphragm stop from the information supplied from the variable resistor 13a and the light-measuring element Pd or calculates, at a terminal A, the appropriate exposure time from the information from the variable resistor 14a and the light-measurement element Pd. Also at a terminal P it selects one of predetermined combinations of the exposure time and diaphragm stop corresponding to the information from the light-measuring element Pd, and, at a terminal M, merely receives the information from the variable resistors 13a, 14a.

The exposure operation circuit E supplies the information of manually or automatically selected diaphragm stop from an output port E4 to a diaphragm stop drive device SD. Also in response to a signal indicating the completion of diaphragm stop drive from the diaphragm stop drive device SD through an input port E3, the exposure operation circuit E transmits an exposure start signal through an output port E1 to an input port i12 of the control circuit CC, initiates time counting based on the synchronizing signals supplied from an output port o10 of the control circuit CC, and, after the lapse of the manually or automatically selected exposure time, and exposure end signal from an output port E1 to an input port i12. The diaphragm stop drive circuit SD, upon receipt of a diaphragm drive start signal from an output port o11 of the control circuit CC, drives the diaphragm stop Stp according to the diaphragm signal received from the output port E4 of the circuit E, and, upon completion of the drive, transmits the diaphragm drive completion signal to the input port E3 of the circuit E.

A flash firing circuit F, the input terminal of which is connected to an output port E5 of the exposure operation circuit E, receives therefrom a flash start signal and a flash terminating signal for example when the brightness of the object is low, and performs automatic flash exposure controlled by said signals.

The control circuit releases, through an output port o12 connected to the display element 10 of the image-taking unit C1, a drive signal for indicating the kind of the image signal displayed on the monitor D. The manner of said indication will be explained later in relation to FIG. 5.

Also an output port o13 of the control circuit CC releases drive signals to the display element 18 of the memory unit C2 for displaying the state of use of the memories in the memory system M. In order to retain said display even when the memory unit C2 is detached from the image-taking unit C1, the memory unit C2 is provided therein with a display retaining circuit, which can however be dispensed with in case the element 18 is made of self-retaining electrochromic display element.

Referring to FIG. 6, the output terminal of the AND circuit An is connected to an input port i11 of the control circuit CC, which, in response to an L-level output from said AND circuit An, terminates the supply of drive signals from the output port o2 to the control terminal Rc of the reproduction processing circuit R, thus disabling the function thereof.

An input terminal of said circuit An is connected to a T flip-flop T, which alternately releases L- and H-level output signals in response to the actuations of a push-botton 10.

The other input terminal of said circuit An is connected to a first output terminal Sto of a self-timer circuit St, of which output is shifted from H-level to L-level upon actuation of the button 2 for starting the self-timer and returned to H-level after the laspe of a determined time. Said circuit St is provided with a second output terminal sto' connected to the input port i1 of the control circuit CC to release an L-level output after a determined time from the actuation of the button 2.

Now there will be explained the function of the above-explained embodiment, at first in the image-taking in the automatic access mode, in which the control circuit CC makes automatic successive access to the unused memories of the memory system M upon each full-push of the trigger button 1 to store the shot image signal in the selected memory.

In the original state all the components are maintained out of function.

Upon positioning of the lever 7 at "A" as shown in FIG. 2, the switch 7c shown in FIG. 4 is connected to the input port i6 of the control circuit CC to indicate thereto that the automatic access mode is selected.

Then the exposure mode selecting slider 12 is positioned at a desired mode. Let us assume that the shutter preferential mode is selected. Thus the slider 12 is positioned at "T", and the exposure time selecting slider 13 is moved to a desired exposure time. Accordingly the switch 12a shown in FIG. 4 is connected to the terminal T to transmit the selection of the shutter preferential mode to the circuit E, and the manually selected exposure mode is transmitted to said circuit E.

In response to a first half-push of the trigger button 1, the switch 1a shown in FIG. 4 is connected to the input port i1 of the control circuit CC, whereby the output ports o1, o2 and o10 thereof release drive signals and synchronizing signals to activate the record processing system W, reproduction processing system R and exposure operation circuit E. Simultaneously in response to the control signal from the output port o6, the output terminal of the switching circuit S1 is connected to the input terminal S1a, and the gate circuit G1 is opened by the control signal from the output port o4.

Consequently the original image signal is transmitted through the ID path. In this state the record processing system W and the reproduction processing system R are driven at a determined frequency of moving image, for example 30 frames per second, whereby the monitor D displays the image focused on the image-taking element I as a moving image, thus enabling determination of the object to be taken.

In this state the exposure time or charge accumulating time is fixed at a determined value independent from the exposure time determined by the slider 13, and the exposure operation circuit E transmits, to the diaphragm stop drive device SD, a signal indicating an appropriate diaphragm aperture calculated from said determined value and the output from the light-measuring device Pd. In response to said signal and the diaphragm drive start signal from the control circuit CC, said device SD constantly controls the diaphragm stop Stp at an appropriate aperture.

The signal path opened by the actuation of the trigger button 1 is maintained even after said button is released.

In response to a second half-push of the button 1, the exposure operation circuit E calculates, in the shutter preferential mode, the appropriate diaphragm aperture from the brightness of the object from the light-measuring element Pd and the exposure time manually selected, and transmits the appropriate diaphragm signal to the diaphragm stop drive device SD. At the same time the control circuit CC transmits the diaphragm drive start signal in response to which the device SD drives the diaphragm stop Stp according to said appropriate diaphragm signal. Upon completion of said drive the device SD releases the diaphragm drive completion signal, in response to which the exposure operation circuit E transmits the exposure start signal to the input port i12 of the control circuit CC, whereby said circuit CC releases the exposure start signal through the output port o1 to cause the record processing circuit W to initiate the exposure by the image-taking element I, i.e. the charge accumulation therein in case said element is composed of a charge-coupled device. After the lapse of the exposure time determined by the slider 13 from the exposure start signal, the circuit E transmits the exposure end signal to the input port i12 of control circuit CC, which thus transmits the exposure end signal to the processing system W to terminate the exposure of the image-sensing element I. In case the image-sensing element I is composed of a charge-coupled device, the charges accumulated in the light-receiving areas are transferred to the accumulating areas in response to said exposure end signal. Subsequently the circuit CC releases the control signal from the output port o7 to enable the passage of the image signal through the switching circuit S2 from the first input terminal S2a thereof, and releases the write-in signal from the output port o8 to enable the storage in the buffer memory B. The image signal stored in the shutter preferential mode is read from the image-sensing element I by the synchronizing signals supplied in succession from the output port o1 to the record processing system W. Also in synchronization with said signal read-out the address signal is released from the output o8 for making access to all the memory cells in the buffer memory B, whereby the image signal from the image-sensing element I is transmitted through the IB path and stored in said buffer memory B. Upon storage of the image signal of one frame in the buffer memory B, the circuit CC terminates the supply of drive signal to the record processing system W, releases the control signal from the output port o6 to enable the passage of the image signal through the switching circuit S1 from the second input terminal S1b, and releases the read-out access signal from the output port o8 for making repetitive accesses to all the memory cells of the buffer memory B at a frequency of 30 frames per second. Consequently the shot image signal stored in the buffer memory B is repeatedly read and transmitted through the BD path to provide a still display on the monitor D.

In case of recording the image displayed on the monitor D, the trigger button is fully pushed, whereby the control circuit CC releases, from the output port o3, the write-in signal and the first address signal for making access to the unused memory of the memory system M in the aforementioned access operation, and simultaneously releases, from the output port o8, the second address signal in synchronization with the address signal supplied to the memory B in order to store the shot image signal into the selected memory cells. Consequently the original image signal of one frame stored in the buffer memory B, i.e. the shot image signal, is transmitted through the BM path in addition to the BD path and stored in the automatically selected memory of the memory system M. Upon completion of the image recording the second address signal is terminated, and the entire system returns to the state without input or output of the image signal prior to the first half-push of the trigger button 1.

The following Tab. 1 summarizes the function in the automatic access mode:

TABLE 1

| Actuation of trigger button | Image signal path | Image signals transmitted in said path |
|---|---|---|
| Half-push (1) | ID | Original image signal |
| Half-push (2) | 1. IB | Original image signal |
|  | 2. BD | Shot image signal |
| Full-push | BM | Shot image signal |

In the following explained is the image taking procedure in the manual access mode, in which a memory in the memory system M is manually selected regardless of whether said memory is already used, and the shot image signal is stored in the thus selected memory.

In response to the positioning of the lever 7 at "MAN", the switch 7b shown in FIG. 4 is closed to connect the switch 8a linked with the access button 8 to the input port i5 of the control circuit CC and to connect the switch 7c to the input port i7 thereby transmitting the selection of the manual access mode to the circuit CC.

Then the exposure mode selecting slider 12 is positioned at a desired mode. Let us assume that the diaphragm preferential mode is selected. Thus the slider 12 is positioned at "A", and the diaphragm selecting slider 14 is moved to a desired diaphragm aperture. In response the switch 12a shown in FIG. 4 is connected to the terminal A to transmit the selection of the diaphragm preferential mode to the exposure operation circuit E, and the information of manually selected diaphragm aperture is likewise transmitted to said circuit E.

In response to a first half-push of the trigger button 1, the ID path is opened in the same manner as in the aforementioned automatic access mode to display the object as a moving image on the monitor C.

Then in response to a second half-push of the trigger button 1, the IB path is opened in the same manner as in the aforementioned automatic access mode, then is closed upon completion of the storage of the original image signal into the buffer memory B, and the BD path is opened.

Because of the selection of the diaphragm preferential mode, the diaphragm stop drive device SD controls the diaphragm stop Stp according to the diaphragm stop signal from the circuit E manually determined by the slider 14. Said circuit E calculates the appropriate exposure time from the object brightness obtained from the light-measuring element Pd and the diaphragm aperture manually selected by the slider 14, then transmits the exposure start signal to the input port i12 of the control circuit CC, and the exposure end signal thereto after the lapse of said appropriate exposure time. The monitor D displays an image taken under such exposure control.

Then, in response to a third half-push of the trigger button 1, the control circuit CC terminates the supply of the read-out signal and address signal from the output port o8 to the buffer memory B to terminate the image reproduction of the shot image signal along the BD path, and releases an H-level signal from the output port o5 to open the gate circuit G2. At the same time the output port o3 transmits to the memory system M the first address signal for access to the memory selected in the preceding image-taking, the read-out signal for reading the content of said memory, and the repeated second address signal, thereby repeatedly reading the image signal stored in said memory and displaying said image signal on the monitor D. If necessary, the access button 8 is actuated to stepwise advance the memory address in order to look for a suitable memory for storing the shot image signal stored in the buffer memory B. Thus a memory having unnecessary image signal is searched by observing the monitor D.

Then in response to the full-push of the trigger button 1, the BM path is opened in the same procedure as in the automatic access mode to write the image signal stored in the buffer memory B into the memory selected manually. Upon completion of said writing, the entire system of the camera returns to the state prior to the first half-push of the trigger button 1.

The following Table 2 summarizes the functions in the above-mentioned manual access mode.

TABLE 2

| Actuation of trigger botton | Image signal path | Image signal in said path |
| --- | --- | --- |
| Half-push (1) | ID | Original image signal |
| Half-push (2) | 1. IB | Original image signal |
|  | 2. BD | Shot image signal |
| Half-push (3) | MD | Stored image signal |
| (button 8) | (MD) | (Stored image signal) |
| Full-push | BM | Stored image signal |

In the following explained is the first image synthesizing mode in which the lever 7 is positioned at "MUL" and the slider 8 is at "CM", wherein obtained is an image superposed from the shot image signal in the buffer memory B and the stored image signal in the memory system M.

In this mode the lever 7 is positioned at "MUL" to close the switch 7b shown in FIG. 4 and to connect the switch 7c to the common terminal of the switch 9a. Also the slider 9 is positioned at "CM" to connect the switch 9a to the input port i8 of the control circuit CC, thereby transmitting thereto the selection of the multiple exposure mode in the first image synthesizing mode. It is assumed in this case that the exposure mode selecting slider 12 is positioned at "P" for the programmed exposure mode, whereby the switch 12a shown in FIG. 4 is connected to the terminal P of the exposure operation circuit E to disconnect the information on the exposure time and diaphragm stop by the variable resistors 13a and 14a.

In response to a first half-push of the trigger button 1, the ID path is opened in the same procedure as in the aforementioned automatic access mode to supply the original image signal to the monitor D, thus displaying the object in a moving image thereon.

Then, in response to a second half-push of the trigger button 1, the IB path is opened in the same manner as in the aforementioned automatic access mode, and upon completion of the storage of the original image signal into the buffer memory B the BD path is opened to repeatedly read the shot image signal stored in the buffer memory B thus displaying a still image on the monitor D. Due to the selection of the programmed exposure mode, the diaphragm stop drive device SD drives the diaphragm stop Stp according to the appropriate diaphragm stop signal determined auto-matically from the brightness of the object in the circuit E and supplied from the output port E4 thereof. Also said circuit E calculates the appropriate exposure time according to the object brightness, releases the exposure start signal to the input port i12 of the control circuit CC, and further releases the exposure end signal to said input port i12 after the lapse of said exposure time. The image displayed on the monitor D is obtained under such exposure control.

Then, in response to a third half-push of the trigger button 1, the MD path is opened in the same as in the aforementioned manual access mode to read the image signal from a memory used in the preceding image-taking, while the BD path is maintained open. Consequently the shot image signal is supplied from the memory B to the first input terminal Aa of the adding circuit A while the stored image signal is supplied from the selected memory of the memory system M to the second input terminal Ab. The adding circuit A adds both input signals in synchronization under the control of the circuit CC supplies the obtained signal to the monitor D, which thus displays a multiple-exposed image synthesized from the shot image signal and the stored image signal.

If necessary the operator actuates the access button 8 while observing the monitor D to select a memory storing more suitable image signal for superposing.

Also in order to record said image, the trigger button 1 is fully pushed, whereby the control circuit CC releases, from the output port o3, the first access signal for access to the memory storing said stored image signal, the read-out signal, and the second access signal for access to the first memory cell corresponding to the first picture element of the image signal, while maintaining the switching circuit S1, gate circuits G1, G2 and reproduction processing system R in a state prior to said full-push. At the same time the output port o8 releases the read-out signal and the address signal for access to the corresponding memory cells of the buffer memory B in synchronization with the above-mentioned second address signal. The shot image signal and the stored image signal corresponding to the first picture element supplied from the memory B and the memory system M are respectively delayed by the delay circuits De1, De2. In the meantime the control circuit CC releases, through the output port o3, the first access signal for access to an unused memory in the memory system M. In this manner the MM path and BM path are both opened, and the shot image signal and the stored image signal corresponding to the first picture element are added in the adding circuit A and stored in a corresponding memory cell in the unused memory. Thereafter the control circuit CC releases, from the output port o3, the first address signal for access to the memory having the stored image signal, read-out signal and second address signal for access to a memory cell storing the second pixel of said stored image signal, and simultaneously releases, from the output port o8, the address signal for a corresponding memory cell of the buffer memory B, whereby the signal corresponding to the second picture element of the shot image signal and the stored image signal is stored in a corresponding address in the unused memory.

The above-mentioned procedure is repeated for all the picture elements in one frame, and, upon completion of the addition and storage of the shot image signal and the stored image signal for the last picture element, the entire system of the camera returns to the state without input or output of the image signals.

The following Table 3 summarizes the function in the above-explained first image synthesizing mode.

TABLE 3

| Actuation of trigger button | Image signal path | Image signal therein |
|---|---|---|
| Half-push (1) | ID | Original image signal |
| Half-push (2) | 1. IB | Original image signal |
| | 2. BD | Shot image signal |
| Half-push (3) | BD + MD | Shot image signal + Stored image signal |
| (Button 8) | (BD + MD) | (Shot image signal + Stored image signal) |
| Full-push | BM + MM | Shot image signal + Stored image signal |

In the following explained is the second image synthesizing mode in which the lever 7 is positioned at "MUL" and the slider 9 is positioned at "MM".

In this case there is obtained by an image superposing a first stored image signal and a second stored image signal both stored in the memory system M.

In this mode the lever 7 is positioned at "MUL" to close the switch 7b shown in FIG. 4 and to connect the switch 7c to the common terminal of the switch 9a, and the slider 9 is positioned at "MM" to connect the switch 9a to the input port i9 of the control circuit CC, thus advising the circuit CC of the selection of the multiple exposure mode in the second image synthesizing mode.

In this case the selection of the exposure mode is unnecessary since the image-taking by the element I is not conducted.

In response to a first half-push of the trigger button 1, there is executed the same procedure as in the third half-push of the trigger button 1 in the aforementioned manual access mode, whereby the control circuit CC transmits signals to the memory system M and the gate circuit G2 for access to the memory used in the preceding image-taking procedure. Thus the stored image signal in said memory is repeatedly read through the MD path for display on the monitor D. If necessary the operator actuates the access button 8 until a desired image is displayed on the monitor D, and the image signal stored in the finally selected memory constitutes the first stored image signal.

Then in response to a second half-push of the trigger button 1, the control circuit CC releases the control signal from the output port o7 to the switching circuit S2 to connect the output terminal to the second input terminal S2b, and releases, from the output port o8 to the member B, a write-in signal and an address signal for access to all the memory cells of said memory B, thereby opening the MB path and reading and storing the first stored image signal in the memory B. In this operation the second address signal to the memory system M is synchronized with the address signal to the buffer memory B. Upon completion of the signal storage in the memory B, the control circuit CC terminates the supply of the above-mentioned signals to the switching circuit S2 and memory system M and of the write-in signal to the buffer memory B, and supplies a read-out signal and repeated address signals to the memory B and a control signal to the switching circuit S1 and gate circuit G1, thereby closing the MB path and opening the BD path. At the same time the control circuit CC opens the MD path in the same manner as in the first half-push of the trigger button 1 in the present mode, wherein an access is made to a used memory next to the memory having the first storage image signal. In this operation the address signal supplied to the buffer memory B from the control circuit CC is synchronized with the second address signal supplied to the memory system M. Consequently the BD path and the MD path are opened simultaneously in the same manner as in the third half-push of the trigger button 1 in the aforementioned first image synthesizing mode, to display, on the monitor D, an image obtained by superposing the first and second stored images.

If necessary the operator actuates the access button 8 while observing the monitor D to select another used memory having a more appropriate second stored image signal.

In order to record the thus obtained image, the trigger button 1 is fully pushed, whereby the multiple exposure image is stored in an unused memory through the BM and MM paths in the same manner as in the aforementioned first image synthesizing mode. Upon completion of the image storage, the entire system of the camera returns to the state prior to the first half-push of the trigger button.

The following Table 4 summarizes the functions in the above-explained second image synthesizing mode.

TABLE 4

| Actuation of trigger button | Image signal path | Image signal therein |
|---|---|---|
| Half-push (1) | MD | First stored image signal |
| (Button 8) | (MD) | (First stored image signal) |
| Half-push (2) | 1. MD | First stored image signal |
| | 2. BD + MD | First stored image signal + Second stored image signal |
| (Button 8) | (BD + MD) | (First stored image signal + Second stored image signal) |
| Full-push | BM + MM | First stored image signal + Second stored image signal |

In the following explained is the function when the lever 7 is positioned at "ch1" for selecting the first chroma key mode and the slider 9 is positioned at "CM" for selecting the first image synthesizing mode, wherein an image is obtained by cutting off a designated color in the shot image and filling in the thus cut-off areas with the corresponding areas of a stored image.

In the above-mentioned mode the lever is positioned at "ch1" to connect the switches Sw1, Sw2 and Sw3 shown in FIG. 3 respectively to the terminals Ch1, Ch1' and Ch1'', to close the switches 7a, 7b shown in FIG. 4 and to connect the switch 7c to the common terminal of the switch 9a. Also the slider 9 is positioned at "CM" to connect the switch 9a to the input port i8 of the control circuit CC. In this manner the first chroma key mode and the first image synthesizing mode are selected respectively in the chroma key circuit shown in FIG. 3 and the control circuit CC shown in FIG. 4. Also the slider 16 is actuated to designate the color to be cut off from the shot image.

Let us assume that the exposure mode selecting slider 12 is positioned at "M" for selecting the manual exposure mode. In response thereto the switch 12a shown in FIG. 4 is connected to the terminal M of the exposure operation circuit E, thus allowing the transmission of the information on exposure time and diaphragm stop determined by the variable resistors 13a, 14a to the circuit E.

In response to a first half-push of the trigger button 1, the ID path is opened in the same manner as in the aforementioned automatic access mode, thus supplying the original image signal to the monitor D and displaying the object thereon in a moving image.

Then, in response to a second half-push of the trigger button 1, the IB path is at first opened in the same manner as in the aforementioned automatic access mode, and, upon completion of the storage of the original image signal into the buffer memory B, there is opened the BD path to repeatedly read the shot image signal of one frame stored in the buffer memory B, thus providing a still display on the monitor D.

In the selected manual mode, the diaphragm stop drive device SD controls the diaphragm stop according to the diaphragm signal received from the output port E3 of the circuit E in response to the manual setting of the slider 13. The circuit E releases the exposure start signal to the input port i12 of the control circuit CC, and again sends the exposure end signal to said terminal after the lapse of the exposure time determined by the slider 12. The image displayed on the monitor D is obtained under such exposure control.

Then, in response to a third half-push of the trigger button 1 the MD path is opened in the same manner as in the aforementioned manual access mode to read the image signal of the memory selected at the provious image taking, while the BD path is maintained open. At the same time the output port o9 releases a drive signal to activate the color discriminating circuit CD. In this manner the stored image signal and the shot image signal are read from the memory system M and the buffer memory B.

The color discriminating circuit CD releases an L-level signal to the inverter Iv and to the first control input terminal G2c of the gate circuit G2 through the switch Sw2 until the shot image signal of a color designated by the slider 16 is entered from the buffer memory B through the switching circuit S1 and the switch Sw1, so that the inverter Iv supplies an H-level signal through the switch Sw3 to the first control input terminal G1c of the gate circuit G1, thereby maintaining the gate circuit G1, and thus the BD path, open. On the other hand the gate circuit G2 is closed to disconnect the MD path. Consequently the shot image signal stored in the buffer memory B is repeatedly supplied to the monitor D to display thereon.

When the shot image signal is changed to the designated color, the color discriminating circuit CD supplies an H-level signal to the inverter Iv and to the first control input terminal G2c of the gate circuit G2 through the switch Sw2, whereby said inverter Iv supplies an L-level signal through the switch Sw3 to the first control input terminal G1c of the gate circuit G1, thus closing said gate to interrupt the shot image signal of the designated color in the BD path. On the other hand the gate circuit G2 is opened to open the MD path, whereby the monitor D displays the stored image signal instead of the shot image signal.

In this manner the monitor D displays a chroma key image in which the shot image signal is cut off in the areas of a designated color and replaced by corresponding areas of the stored image signal. If necessary, the operator may actuate the access button 8 while observing the monitor D to select a used memory having a more suitable stored image signal.

If desired, said chroma key image can be stored by fully pushing the trigger button 1, whereby the chroma key image signal is recorded in an unused memory through the BM and MM paths in the same manner as in the aforementioned multiple exposure and first image synthesizing mode.

Upon completion of the signal storage, the entire system of the camera returns to the state prior to the first half-push of the trigger button.

The following Table 5 summarizes the function of the above-explained first chroma key mode combined with the image-synthesizing mode.

TABLE 5

| Actuation of trigger button | Image signal path | Image signal therein |
| --- | --- | --- |
| Half-push (1) | ID | Original image signal |
| Half-push (2) | 1. IB | Original image signal |
|  | 2. BD | Shot image signal |
| Half-push (3) | BD/MD | Shot image signal/ Stored image signal |
| (Button 8) | (BD/MD) | (Shot image signal/ Stored image signal) |
| Full-push | BM/MM | Shot image signal/ Stored image signal |

In the following explained is the first chroma key mode in the second image synthesizing mode by positioning the lever 7 at "ch1" and the slider 9 at "MM", wherein obtained is an image in which the first stored image selected at first is cut off in the areas of a designated color and is replenished with the corresponding areas of the second stored image selected later.

In this mode the slider 9 is positioned at "MM" to connect the switch 9a to the input port i9 of the control circuit CC whereby the chroma key circuit in FIG. 3 and the control circuit CC in FIG. 4 respectively select the first chroma key mode and the second image synthesizing mode.

The selection of the exposure mode is not necessary since the image-taking by the element I is not conducted in this mode.

In response to a first half-push of the trigger button 1, the MD path is opened in the same manner as in the third half-push of the trigger button 1 in the aforementioned manual access mode, whereby the stored image signal in the memory selected in the preceding image taking is repeatedly read and display on the monitor D.

The operator actuates the access button 8 until a desired stored image is displayed on the monitor D, and the stored image signal in a memory finally selected constitutes the first stored image signal.

Then, in response to a second half-push of the trigger button 1, the first stored image signal is stored in the memory B through the MB path, and, upon completion of said signal storage the MB path is closed. Then the color discriminating circuit CD and the chroma key circuit ARE activated in the same manner as in the aforementioned first chroma key mode combined with the first image synthesizing mode, thus opening either the BD path or the MD path. In this state selected in the memory system M is a used memory positioned next to the used memory having the first stored image signal. When the first storage image signal in the BD path changes to the designated color, the color discriminating circuit CD detects said color and closes the gate circuit G1 thereby interrupting the BD path, and opens the gate G2 to allow the passage of the second stored image through the MD path. Consequently, the monitor D displays a chroma key image in which the first stored image signal is cut off in the areas of the designated color and is replenished with the corresponding areas of the second stored image signal.

If necessary the operator may actuate the access button 8 to select a memory containing a more suitable second memory signal.

If desired said chroma key image can be recorded by fully pushing the trigger button 1, whereby the chroma key signal is recorded in an unused memory selectively through the BM and MM paths in the same manner as in the aforementioned multiple exposure mode combined with the first image synthesizing mode. Upon completion of the signal storage the entire system of the camera returns to the state prior to the first half-push of the trigger button 1.

The following Table 6 summarizes the function in the first chroma key mode in the second image synthesizing mode.

TABLE 6

| Actuation of trigger button | Image signal path | Image signal therein |
|---|---|---|
| Half-push (1) | MD | First stored image signal |
| (Button 8) | (MD) | (First stored image signal) |
| Half-push (2) | 1. MB | First stored image signal |
| | 2. BD/MD | First stored image signal/ Second stored image signal |
| (Button 8) | (BD/MD) | (First stored image signal/ Second stored image signal |
| Full-push | BM/MM | First stored image signal/ Second stored image signal |

In the following explained is the second chroma key mode in the first image synthesizing mode by positioning the lever 7 at "ch2" and the slider 9 at "CM", wherein obtained is an image in which the stored image is cut off in the areas of a designated color and replenished the corresponding areas of the shot image.

The function sequence up to the first and second half-pushes of the trigger button 1 is identical with that in the aforementioned first chroma key mode combined with the first image synthesizing mode, except that a stored image signal suitable for the cut-off of the designated color is selected in combination with a shot image signal suitable for replenishing such cut-off areas.

In response to a third half-push of the trigger button 1, the color discriminating circuit CD is activated in the same manner as in the aforementioned first chroma key mode combined with the first image synthesizing mode, whereby the image signal is read from the memory system M or from the buffer memory B through MD or BD path.

The color discriminating circuit CD supplies an L-level signal to the inverter Iv and to the first control input terminal G1c of the gate circuit G1 through the switch Sw3 until the stored image of a color designated by the slider 16 is received from the memory system M through the switch Sw1, whereby said inverter Iv supplies an H-level signal to the first control input terminal G2c of the gate circuit G2 through the switch Sw3, thereby maintaining the gate G2 and thus the MD path in the open state. On the other hand the gate circuit G1 is closed to close the BD path. Consequently, the stored image signal in the selected memory of the memory system M is repeatedly supplied to the monitor D for display thereon.

When the stored image signal changes to the designated color, the circuit CD releases an H-level signal so that the inverter Iv supplies an L-level signal to close the gate circuit G2, thereby interrupting the stored image signal of the designated color in the MD path. Instead of the gate circuit G1 is opened to supply the shot image signal along the BD path for display thereof on the monitor D.

In response to the full push of the trigger button 1 the chroma key image thus obtained is recorded in an unused memory in the same manner as in the aforementioned first chroma key mode combined with the first image synthesizing mode. Upon completion of the signal storage, the entire system of the camera returns to the state prior to the first half-push of the trigger button 1.

The following Table 7 summarizes the function of the above-explained second chroma key mode combined with the first image synthesizing mode.

TABLE 7

| Actuation of trigger button | Image signal path | Image signal therein |
|---|---|---|
| Half-push (1) | ID | Original image signal |
| Half-push (2) | 1. IB | Original image signal |
| | 2. BD | Shot image signal |
| Half-push (3) | BD/MD | Shot image signal/ Stored image signal |
| (Button 8) | (BD/MD) | (Shot image signal/ Stored image signal) |
| Full-push | BM/MM | Shot image signal/ Stored image signal |

In the following explained is the second chroma key mode in the second image synthesizing mode by positioning the lever 7 at "ch2" and the slider 9 at "MM", wherein obtained is an image in which the second stored image selected later is cut off in the areas of a designated color and replenished with the corresponding areas of the first stored image selected at first.

In this mode the function sequence up to the first half-push of the trigger button 1 is identical with the aforementioned first chroma key mode in the second image synthesizing mode, except that the first stored image signal is so selected as to be suitable for replenishing the cut-off areas of the designated color in the second stored image signal.

In response to a second half-push of the trigger button 1, the first stored image signal is stored in the buffer memory B through the MB path, and, upon completion of said signal storage the MB path is closed. Then the color discriminating circuit CD is activated in the same manner as in the aforementioned first chroma key mode combined with the first image synthesizing mode, thereby opening either the BD or MD path. In this state selected in the memory system M is a used memory positioned next to the memory having the first stored image signal. Then, when the second stored image signal in the MD path changes to the designated color, the color discriminating circuit CD detects said designated color and closes the gate G2 thereby interrupting the BD path. Instead the gate circuit G1 is opened to supply the first stored image signal through the BD path.

Consequently, the monitor D displays a chroma key signal in which the second stored image signal is cut off in the areas of the designated color and is replenished with the corresponding areas of the first stored image signal.

If desired said chroma key image can be recorded by a full-push of the trigger button 1, whereby the chroma key image signal is recorded in an unused memory selectively through the BM or MM path in the same manner as in the aforementioned multiple exposure mode combined with the first image synthesizing mode. Upon completion of the image signal storage, the entire system of the camera returns to the state prior to the first half-push of the trigger button 1.

The following Table 8 summarizes the function in the above-explained second chroma key mode combined with the second image synthesizing mode.

TABLE 8

| Actuation of trigger button | Image signal path | Image signal therein |
|---|---|---|
| Half-push (1) | MD | First stored image signal |
| (Button 8) | (MD) | (First stored image signal) |
| Half-push (2) | 1. MB | First stored image signal |
| | 2. BD/MD | First stored image signal/ Second stored image signal |
| (Button 8) | (BD/MD) | (First stored image signal/ Second stored image signal) |
| Full-push | BM/MM | First stored image signal Second stored image signal |

In case it becomes necessary to shoot the object for several frames while the camera is inactive and the lever 7 is positioned at "A", the operator can fully push the trigger button 1 while aiming at the object through the optical view-finder 4.

In response to the full-push of the trigger button 1 with the lever 7 at "A" position, the control circuit CC supplies a drive signal and a synchronizing signal from the output port o1 to the record processing system W; a control signal from the output port o6 to the switching circuit S1 for connecting the output terminal thereof to the first input terminal S1a; an H-level control signal from the output port o4 to the gate circuit G1; and a first address signal, a write-in signal and a second address signal from the output port o3 to the memory system M for access to an unused memory. Consequently the original image signal corresponding to the object image focused on the image-sensing element I at the full-push of the trigger button 1 is transmitted through the IM path and stored in the selected memory. Upon completion of said signal storage the signals from the output ports o1, o6 and o4 are terminated, and the output port o3 releases a read-out signal repeated second address signals. Simultaneously the output port o2 supplies the reproduction processing system R with a drive signal and synchronizing signals in synchronization with the second address signals supplied to the memory system M, and the output port o5 releases an H-level signal to the gate circuit G2. Consequently the IM path is interrupted, and the image signal stored in the memory system M is transmitted through the MD path to the monitor for display thereon, thereby allowing to confirm the result of image-taking.

The following Table 9 summarizes the above-mentioned functions.

TABLE 9

| Actuation of trigger button | Image signal path | Image signal therein |
|---|---|---|
| Full-push | 1. IM | Original image signal |
| | 2. MD | Stored image signal |

Also the following Table 10 summarizes the function in case the trigger button 1 is fully pushed from the beginning in the inactive state of the camera while the lever 7 is positioned at "MUL" and the slider 9 is positioned at "CM" to select the first image synthesizing mode.

In this case, in response to the full-push of the trigger button 1, the control circuit supplies signals to the reproduction processing system W, switching circuit S1, gate circuit G1 and switching circuit G2 for opening the IB path; a first address signal, a read-out signal and a second address signal from the output port o3 to the memory system M for access to a memory selected in the preceding image-taking; and an H-level control signal from the output port o5 to the gate circuit G2 for opening the same, whereby the IB and MAB paths are both opened. Thus the original image signal of one frame corresponding to the image focused on the image-sensing element I at the full-push of the trigger button 1 and the stored image signal from the memory selected at the preceding image-taking are added synchronously in the adding circuit A and stored as a multiple exposure image in the buffer memory B. Upon completion of said storage there are opened the BD and BM paths with an unused memory selected in the memory system M, whereby said multiple exposure image is displayed on the monitor D and simultaneously stored in the memory system M.

TABLE 10

| Actuation of trigger button | Image signal path | Image signal therein |
|---|---|---|
| Full-push | 1. IB + MAB | Original image signal + stored image signal |
| | 2. BD, BM | Multiple exposure image signal |

In case the trigger button is fully pushed from the beginning with lever 7 positioned at "ch1" or "ch2" and with the slider 9 positioned at "CM" to select the chroma key in the first image synthesizing mode, the control circuit CC supplies the same signals in the aforementioned multiple exposure mode combined with the first image synthesizing mode and a drive signal from the output port o9, whereby the color discriminating circuit CD is activated to selectively control the gate circuits G1, G2 thereby opening either the IB or MAB path. Upon completion of the signal storage in the buffer memory B, there are opened the BD and BM paths in the same manner as in the aforementioned first image synthesizing mode, whereby the original image signal of one frame corresponding to the object image focused on the image-sensing element I at the full-push of the trigger button 1 and the stored image signal in the memory selected in the preceding image-taking operation are displayed as a chroma key image on the monitor D and similarly stored in an unused memory.

The following Table 11 summarizes the above-explained function.

TABLE 11

| Actuation of trigger button | Image signal path | Image signal therein |
| --- | --- | --- |
| Full-push | 1. IB/MAB | Original image signal/ Stored image signal |
|  | 2. BD, BM | Chroma key image signal |

It is possible, by suitable manipulation of the brightness adjusting slider 15 during the image-taking operation while observing the monitor D, to change the output from the brightness control signal generating means 15a thereby regulating the brightness level of the image signal transmitted by the adding circuit A. In this manner it is rendered possible for example to regulate the weights of two images to be superposed in the multiple exposure mode.

Actuation of the clear button 6 during the image-taking operation closes the switch 6a to release a clear signal to the control circuit CC through the input port i3, whereby said circuit CC releases a control signal for returning the function of the various components and the path of image signal to a preceding state.

For example in case the clear button 6 is actuated after the first half-push of the trigger button 1, the components of the camera return to an inactive state without input or output of the image signal.

Also in the automatic access mode, if the shot image displayed on the monitor through the BD path after the second half-push of the trigger button 1 is unsatisfactory, the operator can push the clear button 6 to cause the control circuit CC to supply the same control signals as those after the first half-push of the trigger button. Thus the ID path is opened to display the original image signal on the monitor D, thus enabling to re-record the shot image signal.

Furthermore if the trigger button 1 is half pushed instead of a full-push for storing the image signal in the memory system M, the path for the image signal returns to a state after the first half-push of the trigger button.

Thus, for example in the multiple exposure mode, if the image displayed on the monitor D after three half-pushes of the trigger button 1 is not suitable for recording in the memory system M, the operator can half-push the trigger button 1 instead of a full-push in order to renew the image-taking procedure.

The display element shown in FIG. 2 shows the nature of the image signal displayed on the monitor D, in response to the drive signal from the output port o12 of the control circuit CC, thus clarifying whether the image signal transmitted by the adding circuit A is an original image signal from the image-sensing element I, a shot image signal from the buffer memory B, or a stored image signal from the buffer memory B or the memory system M.

FIGS. 5A to 5F indicate the modes of display by said display element 10, in which FIG. 5A represents an original image signal, FIG. 5B represents a shot image signal, FIG. 5C represents a stored image signal wherein the number indicates the address of the memory in which said signal is stored, and FIG. 5D represents a shot image signal and a stored image signal. These displays appear in succession corresponding to the half-pushes of the trigger button 1 in case the multiple exposure mode or the chroma key mode is selected in combination with the first image synthesizing mode. Also FIGS. 5E and 5F indicate the displays when the second image synthesizing mode is selected, wherein FIG. 5E represents a first stored image signal, and FIG. 5F represents a first stored image signal and a second stored image signal.

In case the display on the monitor D is unnecessary, the operator can push the button 11 shown in FIG. 2 to close a switch 11a shown in FIG. 6, whereby the flip-flop T releasing an H-level output in response to the first actuation of the trigger button 1 is shifted to the L-level output, thus causing the AND circuit An to supply an L-level signal to the input port i11 of the control circuit CC. In response, the control circuit CC terminates the supply of the drive signal from the output port o2 to the reproduction processing circuit R thereby disabling said circuit R and terminating the display on the monitor D.

Image-taking operation with the self-timer is possible in the automatic access mode, manual access mode, first image synthesizing mode, or chroma key combined with first image synthesizing mode. For this purpose, the first half-push of the trigger button 1 is executed to open the ID path, and the framing is determined by the original image displayed on the monitor D. Then the button 2 shown in FIG. 1 is pushed in place of the second half-push of the trigger button 1. Thus a switch 2a shown in FIG. 6 is closed, and, after the lapse of a determined time, the second output terminal Sto' supplies an L-level signal to the input port i1 of the control circuit CC which thus opens the IB path in the same manner as in the second half-push of the trigger button 1, thereby completing the image-taking process by the self-timer.

In response to the closing of the switch 2a, the self-timer circuit St shifts the H-level signal, released from the first output terminal Sto in response to the first half-push of the trigger button 1, to the L-level during said determined time. Thus the AND circuit An supplies an L-level output signal to the input port i11 of the control circuit CC during said determined period, thus disabling the reproduction processing system R and the monitor D. In this manner the power consumption is reduced in the self-timer operation, in which the monitor D cannot be observed.

When all the memories in the memory system M are filled with image signals, the memory unit C2 is detached from the image-taking unit C1 and connected to an unrepresented external memory device such as a video tape recorder for transferring the image signals to another recording medium such as a magnetic tape in the form of digital signals or in the form of analog signals after conversion by a digital-to-analog converter provided in said external memory device, and the memory unit C2 is prepared for re-use. The read-out of the image signals from the memories can be conducted by the first address signal, read-out signal and second address signal supplied in succession from the external memory device to the memory system M.

Each memory is composed of memory cells, each composed for example of 4-bit structure, of a number larger by one than the number of picture elements in a frame. As an example, for a number of picture elements of $10^6$, there are provided $10^6+1$ memory cells. This is in order to store a cue signal in the address 0 and to store the image signal of one frame from address 1 to address $10^6$. Said cue signal is provided to indicate whether the selected memory is already occupied, i.e. whether the selected memory contains an image signal not yet transferred to the external memory device. Said cue signal is attached to the head of image signal for each frame by means of the record processing system R, and can be distinguished from the image signal. Said cue signal is erased upon completion of the transfer of image signal from the memory to the external memory device. More specifically, upon completion of the transfer, the external memory device transmits, to the memory system M, a first address signal for access to the memory having completed the signal transfer, a write-in signal and a second address signal for access to the address 0 in which the cue signal is stored, and in this manner said external memory device writes a signal, for example "1111", which is different from the cue signal for example "0000", into a memory cell of the address 0 thereby erasing the cue signal.

In the following explained is the function of the control circuit CC for access to an unused memory, having no signal therein or having a signal already transferred to the external memory device, by means of said cue signal.

It is assumed that a memory unit C2 containing some used memories and some unused memories is attached to the image-taking unit C1. The control circuit CC at first supplies a first address signal for access to the first memory, a read-out signal and a second address signal for access to a memory cell of address 0 from the output port o3 to the memory system M. If a cue signal is supplied in response from the output terminal of the memory system M to the input port i11, the control circuit CC identifies that said memory is already used and contains an untransferred image signal. Then the control signal supplies a first address signal for access to the second memory, a read-out signal and a second address signal same as explained above from the output port o3 to the memory system M. If said memory also contains a cue signal, the control circuit CC supplies a first address signal for access to the third memory, a read-out signal and a second address signal same as explained above, and such operation is repeated until a memory without cue signal is located.

Let us assume that, upon access to the n-th memory, a cue signal is not supplied from the output terminal of the memory system M to the input port i11. The control circuit identifies that said memory is still unused and does not contain the untransferred image signal.

At the storage of the image signal of one frame into said memory, the control circuit replaces the read-out signal with the write-in signal, and makes successive accesses to all the memory cells from the address 0 to $10^6$. Also the control circuit CC memorizes the address of this n-th memory.

In case of the next access for an unused memory, the control circuit initiates the operation of access starting from the (n+1)-th memory next to the n-th memory selected last time.

If it is found that all the memories have cue signals upon access thereto, the control circuit CC disables the entire system and provides an alarm.

The address of the memory memorized in the control circuit CC is erased when the memory unit C2 is detached from the image-taking unit C1.

In case of access to a used memory storing untransferred image signal, the control circuit CC performs the same function as in the aforementioned access operation until a cue signal is supplied from the memory system M to the input port i11. In case of signal read-out from a memory selected, the control circuit CC releases the second address signal in succession from the address 0 to $10^6$ subsequent to that for the address 0 for access to the cue signal.

The above-mentioned access function of the control circuit CC is conducted in response to the actuation of the trigger button 1 or the access button 8.

The camera of the present embodiment is not equipped with a power switch since the control circuit CC is so structured that the entire system of the camera is activated upon actuation of the trigger button 1 and is deactivated if the camera is not manipulated for a determined time.

The switches Sw1, Sw2 and Sw3 are preferably composed not of mechanical switches but of semi-conductor switches controlled by the control signals from the control circuit CC.

In the present embodiment the signal paths are cyclically switched by the actuations of the trigger button 1, but it is also possible to provide a manual operating member on each signal path and to open the desired signal path by manipulating said manual operating member. For example there can be employed a structure in which, after the actuation of a button for selecting the multiple exposure mode, a button for opening the IB and BD paths and another button for opening the MB and BD paths are manually actuated to display on the monitor D a multiple exposure image obtained by superposing the shot image and the stored image.

Furthermore it is possible to relate the actuations of the trigger button 1 with the selection of the signal paths in the following manner:

(1) In response to a first half-push of the trigger button 1 there are opened the IB path and then the BD path. Consequently the monitor D displays a still image of the object focused on the image-sensing element I at said first half-push, and said display is maintained as long as said half-push is continued;

(2) The trigger button 1 is released if the image displayed on the monitor D is unsatisfactory, whereby the ID path is opened to display the object on the monitor D in a moving image;

(3) The operator can repeat the steps (1) and (2), i.e. half-push of the trigger button (IB and BD path) and releasing thereof (ID path) while observing the monitor D until a desired shot image is obtained;

(4) If the monitor D shows an image suitable for recording, the trigger button 1 is fully pushed whereby the BM path is opened to store the shot image signal in the memory system M.

In the foregoing embodiment the memories B, M are composed of solid-state memory elements, but the present invention is not limited to such embodiment and includes the use of other memory means such as magnetic disks or magnetic tapes.

Also the image-sensing means I is not limited to a solid-state imaging device such as the charge-coupled device but also includes an imaging tube.

Also the display means D can be composed of a color display device employing a cathode ray tube.

Furthermore the memory means M may be connected through a cable with the image-taking means I or the display means D.

Furthermore, although the foregoing embodiment has been limited to a camera for recording a still image, the present invention is also applicable for a camera for recording moving images.

We claim:

1. An electronic still camera of a size suitable to be held in a hand of an operator, comprising:
   (a) a camera housing;
   (b) optical means disposed in said camera housing and forming an optical image of an object to be photographed on a predetermined surface positioned in said camera housing;
   (c) image-sensing means arranged on said predetermined surface for converting said optical image into electronic data form;
   (d) visual finder means for visually displaying said optical image, said finder means comprising a display monitor arranged on said camera housing;
   (e) first storing means arranged in said camera housing for recording electronic data corresponding to a still image of said optical image;
   (f) second storing means having at least one memory in which the electronic data corresponding to the still image of said optical image are recorded;
   (g) first control means for reading out repeatedly at a predetermined cycle said electronic data of said image-sensing means and producing a first electronic image signal expressed as a continuation of said electronic data;
   (h) second control means for transferring to said first storing means the electronic data corresponding to the still image out of the electronic data read out by said first control means;
   (i) third control means for reading out repeatedly at a predetermined cycle the electronic data of said first storing means and transferring to said visual finder means a second electronic image signal expressed as a continuation of said electronic data; and
   (j) fourth control means for transferring said second electronic image signal to said one memory of said second storing means.

2. The electronic still camera according to claim 1, wherein said second storing means is disposed in said camera housing.

3. The electronic still camera according to claim 1, wherein said camera housing comprises a first portion including at least said optical means, said image-sensing means and visual finder means and a second portion connectable electronically and mechanically to said first portion and wherein said second storing means is disposed on said second portion.

4. The electronic still camera according to claim 1, wherein said first control means transfers said first electronic image signal to said visual finder means so that said optical image is reproduced as a moving image on said display monitor.

5. An electronic still camera of a size suitable to be held in a hand of an operator, comprising:
   (a) a camera housing;
   (b) optical means arranged in said camera housing and forming an optical image of an object to be photographed on a predetermined surface positioned in said camera housing;
   (c) image-sensing means positioned on said predetermined surface for repeatedly converting at a predetermined cycle said optical image into electronic data form and generating an electronic image signal expressed as a continuation of said electronic data;
   (d) trigger switch means arranged on said camera housing for generating a first trigger signal and a second trigger signal in response to first operation by said operator and subsequent second operation by the operator, respectively;
   (e) visual finder means for visually displaying said optical image, said visual finder means comprising a display monitor arranged on said camera housing;
   (f) storing means arranged in said camera housing and including at least one memory for holding electronic data corresponding to a still image of said optical image; and
   (g) control means having first means and second means, the first means driving said memory to write the electronic data corresponding to the still image out of said electronic image signal in response to said first trigger signal and repeatedly reading out the electronic data written in said memory at a predetermined cycle to transfer it to said visual finder means and the second means holding in said storing means the electronic data written in said memory in response to said second trigger signal.

6. The electronic still camera according to claim 5, wherein said storing means is provided with first storing means having a first memory and second storing means having at least one memory and wherein said means of said control means transfers the data in said first memory to said at least one memory to write therein.

7. The electronic still camera according to claim 5, wherein said optical means includes an objective lens facing outside of a forward wall of said camera housing and wherein said monitor means is positioned to face outside of a rearward wall of said camera housing.

8. The electronic still camera according to claim 5, wherein said trigger switch means comprises a displacing member permitting first and second displacements by said operator, means for producing said first trigger signal in response to said first displacement of said displacing member and means for generating said second trigger signal in response to said second displacement to said displacing member.

9. An electronic still camera of a size suitable to be held in a hand of an operator, comprising:
   (a) a camera housing;
   (b) optical means arranged in the camera housing and forming an optical image of an object to be photographed on a predetermined surface positioned in said camera housing;
   (c) image-sensing means positioned on said predetermined surface, for repeatedly converting at a predetermined cycle said optical image into electronic data form and producing an electronic image signal expressed as a continuation of said electronic data;
   (d) trigger switch means arranged on said camera housing for generating a first trigger signal and a second trigger signal in response to a first operation by said operator and subsequent second operation, respectively;
   (e) visual finder means for visually displaying said optical image, said visual finder means comprising a display monitor arranged on said camera housing;
   (f) storing means arranged in said camera housing and comprising at least one memory for writing electronic data corresponding to a still image of said optical image; and
   (g) control means having first means and second means, the first means transferring said electronic image signal to said visual finder means in response to said first trigger signal and reproducing said optical image as a moving image on said display monitor, and the second means writing in said memory electronic data corresponding to the still image out of said electronic image signal in response to said second trigger signal, reading out repeatedly the electronic data written in said memory at a predetermined cycle to transfer it to said visual finder means and to reproduce said still image on said display monitor.

10. The electronic still camera according to claim 9, wherein said trigger switch means generates a third trigger signal in response to a third operation by said operator after said second operation by said operator and wherein said control means further includes third means for holding in said storing means the electronic data written in said memory in response to said third trigger signal.

11. The electronic still camera according to claim 9, wherein said trigger switch means comprises a displacing member permitting first and second displacements by said operator, means for producing said first trigger signal in response to said first displacement of said displacing member and means for generating said second trigger signal in response to said second displacement of said displacing member.

12. An electronic still camera of a size suitable to be held in a hand of an operator, comprising:
   (a) a camera housing;
   (b) optical means arranged in the camera housing and forming an optical image of an object to be photographed on a predetermined surface positioned in said camera housing;
   (c) image-sensing means disposed on said predetermined surface, for repeatedly converting said optical image at a predetermined cycle into electrical data form and producing an electronic image signal expressed as a continuation of said electronic data;
   (d) trigger switch means positioned on said camera housing for generating a trigger signal by an operation of said operator;
   (e) storing means arranged in said camera housing and having a plurality of memories each of which records electronic data corresponding to a still image of said optical image;
   (f) display means for reading out said electronic data from one of the plurality of memories of said storing means in response to said trigger signal and for visually displaying the still image corresponding to the read out electronic data, the display means comprising a display monitor arranged on said camera housing; and
   (g) selection means positioned in said camera housing and operated by said operator in order to select either clearing of said one memory or holding in said one memory said electronic data corresponding to said still image shown on said display monitor.

13. An electronic still camera of a size suitable to be held in a hand of an operator, comprising:
   (a) a camera housing;
   (b) optical means arranged in said camera housing and forming an optical image of an object to be photographed on a predetermined surface positioned in said camera housing;
   (c) image-sensing means positioned on said predetermined surface for repeatedly converting said optical image at a predetermined cycle into electronic data form and producing an electronic image signal expressed as a continuation of said electronic data;
   (d) first storing means disposed in said camera housing for recording electronic data corresponding to a still image of said optical image;
   (e) second storing means having a plurality of memories each of which records said electronic data corresponding to said still image of said optical image;
   (f) display means for visually displaying said optical image, the display means comprising a display monitor arranged on said camera housing;
   (g) first control means for recording in said first storing means the electronic data corresponding to the still image out of said electronic image signal, reading out repeatedly the data recorded in said first storing means at a predetermined cycle, transmitting the read out data to said display means and causing said display monitor to display the still image thereon;
   (h) second control means for transferring the data in said first storing means to one of the plurality of memories in said second storing means; and
   (i) clear means operable by said operator for clearing the data of said first storing means.

14. An electronic still camera of a size suitable to be held in a hand of an operator, comprising;
   (a) a camera housing;
   (b) optical means arranged in the camera housing and forming an optical image of an object to be photographed on a predetermined surface positioned in said camera housing;
   (c) image-sensing means disposed on said predetermined surface for repeatedly converting said optical image at a predetermined cycle into electronic data form and generating a first electronic image signal expressed as a continuation of the electronic data;
   (d) first and second storing means each of which is arranged in said camera housing, and in each of which the electronic data corresponding to a still image of said optical image is written and each of which produces second and third electronic image signals, respectively, expressed as a repetition of the written data at a predetermined cycle by electronic urging;
   (e) visual finder means for visually displaying said optical image and comprising a display monitor arranged on said camera housing;
   (f) first means for writing in said first storing means electronic data corresponding to a first still image out of said first electronic image signal;
   (g) second means for writing in said second storing means electronic data corresponding to a second still image out of said first electronic image signal;
   (h) means for forming a fourth electronic image signal which expresses a third still image different from each of said first and second still images, by synthesizing said second electronic image signal and said third electronic image signal in synchronization with each other; and
   (i) means for transferring said fourth electronic image signal to said visual finder means and displaying said third still image on said display monitor.

15. The electronic still camera according to claim 14 further comprising third means for writing in said first storing means the electronic data corresponding to said third still image out of said fourth electronic image signal.

16. An electronic still camera of a size suitable to be held in a hand of an operator, comprising:
(a) a camera housing;
(b) optical means arranged in the camera housing and forming an optical image of an object to be photographed on a predetermined surface positioned in said camera housing;
(c) image-sensing means positioned on said predetermined surface for repeatedly converting said optical image at a predetermined cycle into electronic data form and producing a first electronic image signal expressed as a continuation of the electronic data;
(d) storing means in which the electronic data corresponding to a still image of said optical image is written, and which produces a second electronic image signal expressed as a repetition of the written data at a predetermined cycle by an electronic urging;
(e) visual finder means for visually showing said optical image and comprising a display monitor arranged on said camera housing;
(f) trigger switch means arranged on said camera housing for generating a first trigger signal at the time of an operation by said operator and which generates a second trigger signal after a predetermined lapse of time;
(g) first transfer means for transferring said first electronic image signal to said finder means, and for stopping transfer in response to said first trigger signal; and
(h) second transfer means for writing in said storing means the electronic data corresponding to the still image out of said first electronic image signal in response to said second trigger signal and transferring said second electronic image signal to said finder means.

17. An electronic still camera of a size suitable to be held in a hand of an operator, comprising:
(a) a camera housing;
(b) optical means arranged in the camera housing and forming an optical image of an object to be photographed on a predetermined surface positioned in said camera housing;
(c) image-sensing disposed on said predetermined surface for repeatedly converting said optical image at a predetermined cycle into electronic data form and producing a first electronic image signal expressed as a continuation of said electronic data;
(d) first and second storing means each of which is arranged in said camera housing, and in each of which the electronic data corresponding to a still image of said optical image is written and each of which produces by electronic urging second and third electronic image signals which are expressed as a repetition of the written data at a predetermined cycle;
(e) visual finder means for visually displaying said optical image and comprising a display monitor arranged on said camera housing;
(f) first control means for writing in said first storing means electronic data corresponding to a primary still image out of said first electronic image signal by a connection of said image-sensing means with said first storing means and transferring said second electronic signal to said visual finder means by a connection of said first storing means with said visual finder means thereby to display said primary still image on said display monitor;
(g) second control means for shifting electronic data stored in said first storing means to said second storing means by a connection of said first storing means with said second storing means;
(h) mixing means for synthesizing said second and third electronic image signals and forming a fourth electronic image signal expressing another still image different from each of two still images corresponding to said second and third electronic image signals respectively;
(i) third control means for writing in said first storing means electronic data corresponding to a secondary still image out of said first electronic image signal by a connection of said image-sensing means with said first storing means, and transferring said second electronic image signal to said mixing means by a connection of said first storing means with said mixing means; and
(j) fourth control means for transferring said third electronic image signal to said mixing means by a connection of said second storing means with said mixing means.

18. The electronic still camera according to claim 17 further comprising:
fifth control means for transferring said third electronic image signal to said first storing means by a connection of said second storing means with said first storing means.

19. An electronic still camera of a size suitable to be held in a hand of an operator, comprising:
(a) a camera housing having optical means which forms an optical image of an object to be photographed on a predetermined surface positioned in said housing, image-sensing means arranged on said predetermined surface, and which repeatedly converts said optical image at a predetermined cycle into electronic data form and which produces an electronic image signal expressed as a continuation of said electronic data, first storing means in which an electronic data corresponding to a still image of said optical image is written and the written data is repeatedly generated at a predetermined cycle, second storing means having a plurality of memories in each of which the electronic data corresponding to said still image is written, and display means for reproducing said optical image from said electronic data; and
(b) sequence control means having first connection means for reproducing as a moving image said optical image on said display means by a connection of said image-sensing means with said display means,
second connection means for reproducing as the still image said optical image on said display means by a connection of said image-sensing means with said first storing means and by a connection of said first storing means with said display means,
third connection means for transferring the electronic data stored in said first storing means to one of memories in said second storing means by a connection of said first storing means with said second storing means,
advance operation means arranged on said camera housing and which causes each of the first, second and third connection means to be operated in sequence in response to each of first, second and third operations by said operator, and returning operation means disposed on said camera housing and which causes said third, second and first connection means to be operated in sequence in response to each of first, second and third operations by said operator.

20. An electronic still camera of a size suitable to be held in a hand of an operator, comprising:

(a) a camera housing having optical means which forms an optical image of an object to be photographed on a predetermined surface positioned in said housing, image-sensing means disposed on said predetermined surface for converting repeatedly said optical image at a predetermined cycle into electronic data form and producing an electronic image signal expressed as a continuation of the electronic data, first storing means in which electronic data corresponding to a still image of said optical image is written and in which the written data is produced repeatedly at a predetermined cycle, second storing means having a plurality of memories in each of which the electronic data corresponding to said still image is written, and a display monitor for reproducing said optical image from said electronic data;

(b) control means having first connection means for reproducing as a moving image said optical image on said display monitor by a connection of said image-sensing means with said display monitor, second connection means for reproducing as the still image said optical image on said display monitor by a connection of said image-sensing means with said first storing means and by a connection of said first storing means with said display monitor, and third connection means for reading out the electronic data in one of said memories and reproducing as the still image said optical image on said display monitor by a connection of said second storing means with said display monitor; and (c) display means responsive to said first, second and third connection means for attaining the display to discriminate which electronic data of those in said image-sensing means, said first storing means and said second storing means, an image appearing on said display monitor is based.

* * * * *

UNITED STATES PATENT AND TRADEMARK OFFICE
CERTIFICATE OF CORRECTION

PATENT NO. : 4,456,931
DATED : June 26, 1984
INVENTOR(S) : KENJI TOYODA, ET AL.

It is certified that error appears in the above-identified patent and that said Letters Patent is hereby corrected as shown below:

Column 4, line 52, "second" should read -- first --.

Claim 8, line 7 (Column 26, line 41, change "to" (second occurrence) to --of--.

Signed and Sealed this

Twenty-third Day of October 1984

[SEAL]

Attest:

GERALD J. MOSSINGHOFF

Attesting Officer

Commissioner of Patents and Trademarks